United States Patent
Rosener (10) Patent No.: US 9,100,775 B2
(45) Date of Patent: Aug. 4, 2015

(54) AUDIO DELIVERY SYSTEM FOR HEADSETS

(71) Applicant: Plantronics, Inc., Santa Cruz, CA (US)

(72) Inventor: Douglas K. Rosener, Santa Cruz, CA (US)

(73) Assignee: Plantronics, Inc., Santa Cruz, CA (US)

( * ) Notice: Subject to any disclaimer, the term of this patent is extended or adjusted under 35 U.S.C. 154(b) by 30 days.

(21) Appl. No.: 14/030,625

(22) Filed: Sep. 18, 2013

(65) Prior Publication Data

US 2015/0079900 A1    Mar. 19, 2015

(51) Int. Cl.
*H04W 4/00*    (2009.01)

(52) U.S. Cl.
CPC .................... *H04W 4/008* (2013.01)

(58) Field of Classification Search
CPC .................................................. H04W 4/008
USPC ...................... 455/41.1, 41.2, 41.3
See application file for complete search history.

(56) References Cited

U.S. PATENT DOCUMENTS

| | | | | |
|---|---|---|---|---|
| 8,670,709 B2* | 3/2014 | Griffin et al. | ................. | 455/41.1 |
| 2008/0226094 A1* | 9/2008 | Rutschman | ..................... | 381/79 |
| 2009/0097672 A1* | 4/2009 | Buil et al. | ........................ | 381/80 |
| 2009/0249478 A1* | 10/2009 | Rosener et al. | ................. | 726/19 |
| 2010/0020982 A1* | 1/2010 | Brown et al. | ................... | 381/74 |
| 2010/0161410 A1 | 6/2010 | Tulloch | | |
| 2011/0319018 A1* | 12/2011 | Kroman | ....................... | 455/41.1 |
| 2013/0029685 A1* | 1/2013 | Moshfeghi | ................. | 455/456.1 |
| 2013/0203346 A1* | 8/2013 | Han | ........................... | 455/41.1 |
| 2013/0343584 A1* | 12/2013 | Bennett et al. | ............... | 381/315 |
| 2014/0011446 A1* | 1/2014 | Kangas et al. | .............. | 455/41.1 |

* cited by examiner

*Primary Examiner* — Wen Huang (74) *Attorney, Agent, or Firm* — Richard A. Dunning, Jr.

(57) ABSTRACT

Methods and systems for delivering audio content to a headset are disclosed. A user taps a close proximity data exchange headset onto an device to download audio content. The audio content is played at the headset. In another embodiment, a user can record audio content with a headset and save the content onto a close proximity data exchange device. Other parties may then use the close proximity data exchange device to retrieve the audio content. Security techniques could be implemented to ensure only an authorized person can store or retrieve audio content. The close proximity data exchange headset may be a near field communication (NFC) headset, and the close proximity data exchange device may be an NFC device.

10 Claims, 6 Drawing Sheets

AUDIO DELIVERY SYSTEM FOR HEADSETS

BACKGROUND OF THE INVENTION

Near field communication (NFC) allows devices to establish contactless communication by a near field communication interaction such as "tapping" or "waving" the devices together, bringing the devices into close proximity (within a few centimeters). Communication is via inductive coupling of a magnetic field between a first NFC device and a second NFC device. NFC-enabled devices have become increasingly popular due to their convenience and ease of use, particularly with portable devices such as mobile phones and smartcards. NFC technology has been utilized in many day-to-day transactions including e-ticketing, financial exchanges, and media content distribution.

SUMMARY OF THE INVENTION

The following description is presented to enable any person skilled in the art to make and use the invention. Descriptions of specific embodiments and applications are provided only as examples and various modifications will be readily apparent to those skilled in the art.

According to one embodiment of the invention, a headset messaging system comprises a close proximity data exchange device configured to store audio content and a headset. The headset comprises a processor, memory, a microphone, a transceiver, a speaker and a close proximity data exchange module configured to communicate with the close proximity data exchange device. The headset is configured to retrieve the audio content from the close proximity data exchange device when activated by a close proximity data exchange interaction between the headset and the close proximity data exchange device. The close proximity data exchange device may further comprise a security authentication application configured to authenticate the headset before transmitting the audio content. In some embodiments, the close proximity data exchange device is a near field communication (NFC)-enabled device; the close proximity data exchange module is an NFC module; the NFC module is configured to communicate with the NFC-enabled device; and the close proximity data exchange interaction is an NFC interaction.

The audio content may comprises an audio file. The headset may further comprise a DON/DOFF sensor wherein the headset initiates playback of the audio file at the headset responsive to detecting a donned condition.

In an alternative embodiment, the audio content may also comprise an audio locator reference for locating an audio file stored on a remote device. In this case, the headset may be further configured to retrieve the audio file from the remote device and playback the audio file at the speaker. Alternatively the headset may instruct another device in communication with the headset, such as a mobile phone, to retrieve the audio file from the remote device.

According to another embodiment of the invention, a method of retrieving audio comprises activating a close proximity data exchange interaction between a headset and a close proximity data exchange device, transmitting audio content from the close proximity data exchange device to the headset and playing the audio content at the headset. In some embodiments, the close proximity data exchange device is a near field communication (NFC)-enabled device; and the close proximity data exchange interaction is an NFC interaction.

The method may further comprise authenticating the headset prior to transmitting the audio content.

The headset may comprise a DON/DOFF sensor wherein the headset playing the audio content at the headset is delayed until a donned condition is detected. Furthermore, the headset may comprise a user interface wherein playing the audio content at the headset is delayed until the user interface is activated by the user.

In another embodiment, a method of delivering an audio message comprises recording an audio message with a headset, storing the audio message, activating a close proximity data exchange interaction between the headset and a first close proximity data exchange device, transmitting audio content from the headset device to the first close proximity data exchange device, activating a close proximity data exchange interaction between a second close proximity data exchange device and the first close proximity data exchange device and transmitting audio content from the first close proximity data exchange device to the second close proximity data exchange device. In some embodiments, the first close proximity data exchange device is a first near field communication (NFC)-enabled device; the second close proximity data exchange device is a second NFC-enabled device; and the close proximity data exchange interaction is an NFC interaction.

The audio message may then be played, and listened to, at the second NFC-enabled device. In one embodiment, the method further comprises sending a notification message when audio content has been transmitted the headset device to the first NFC-enabled device.

Security measures may be taken to ensure only authorized devices and users may save and retrieve audio messages. For example, the method may further comprise authenticating the headset prior to transmitting audio content from the headset to the first NFC-enabled device. The method may also further comprise authenticating the second NFC-enabled device prior to transmitting audio content from the first NFC-enabled device to the second NFC-enabled device.

Recording an audio message may comprise processing the audio, including compressing the audio message. The audio content may comprise the audio message and the audio message may be stored on the headset. Alternatively the audio message is stored on a remote device and the audio content comprises an audio locator reference associated with the audio message.

DETAILED DESCRIPTION OF THE DRAWINGS

While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Detailed Description of the Drawings as an embodiment of the invention.

In the present disclosure, various embodiments are described in terms of near field communication (NFC) technology. However, other embodiments may employ other kinds of close proximity data exchange technology. These technologies may involve electromagnetic communication, light communication, communication by direct electrical contact, and the like. Light communication may include technologies such as optical communication, infrared communication and the like. Electromagnetic communication may include technologies such as radio frequency communication, inductive coupling, capacitive coupling, and the like.

As used herein, the terms "NFC-enabled" device, "NFC tag" or "NFC chip" refers to any object equipped with NFC technology. Those skilled in the art will appreciate that the reference to the term "NFC" is used in the generic sense to include any NFC technology-based protocol, technique or equipment without limitation to any particular NFC specification. Hence, "NFC-enabled" device, "NFC tag" or "NFC chip" may refer to a device in different operating modes or configurations such as reader/writer mode, peer-to-peer mode, or card emulation mode. The device may be powered or passive.

Figure 1:
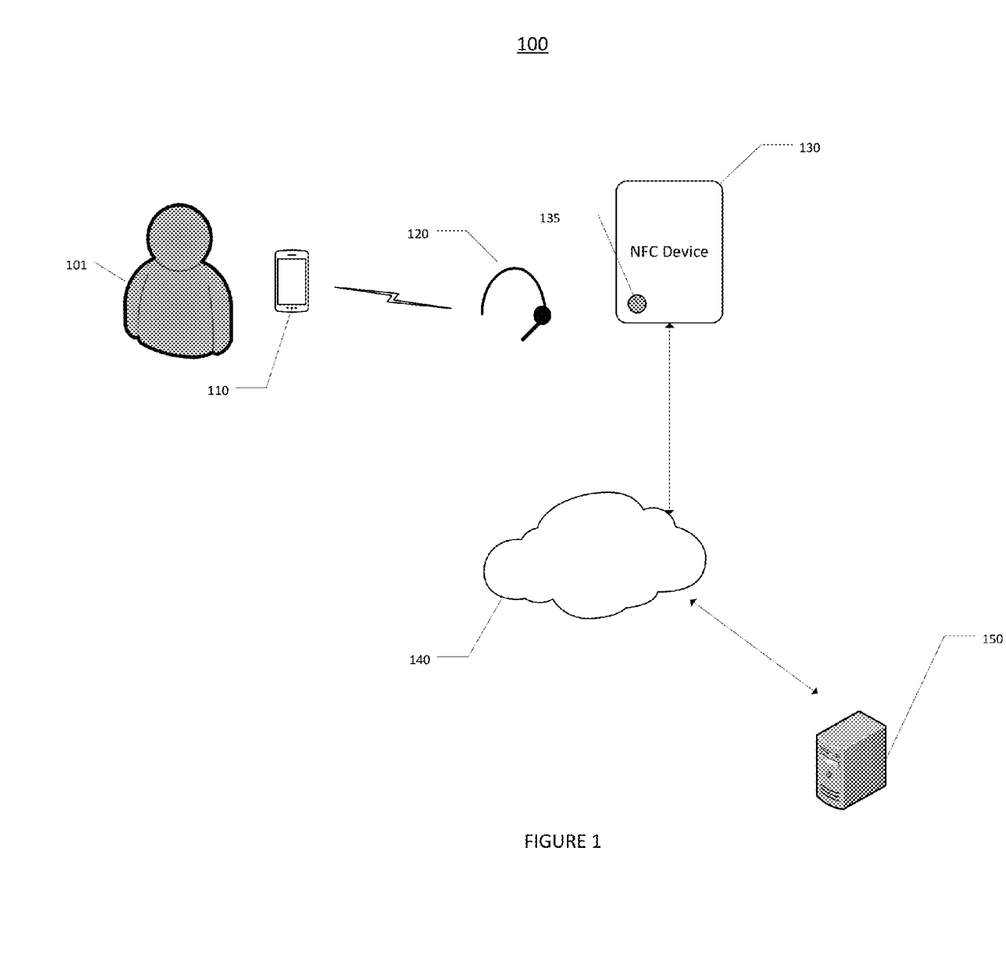
FIG. 1 is a schematic of a system for receiving an audio message on a headset.

Referring to FIG. 1, shown is a system 100 for delivering an audio content to a headset in one embodiment of the invention. The system 100 comprises an NFC-enabled device 130 and an NFC-enabled headset 120.

The NFC-enabled device 130 comprises a touchpoint 135 for communicating with other NFC-enabled devices such as headset 120 or smart phone 110. The NFC-enabled device 130 allows a user 101 to "tap" their NFC-enabled device in near proximity (approximately 0 to 5 cm) of the touchpoint 135 to transfer information between the NFC-enabled device 130 and the user's NFC-enabled device. The NFC-enabled device 130 may be any NFC-enabled device appropriate to deliver content to a user 101. Furthermore, the NFC-enabled device 130 may be housed in a fixed structure or embedded in a portable device. For example, the NFC-enabled device 130 may be in the form of:

a poster as disclosed in "Smart Poster" US Pub. No. 2010/0161410 filed Dec. 19, 2008, a kiosk or similar stand-alone device as disclosed in "Public kiosk providing near field communication services" U.S. Pat. No. 8,422,949 filed May 15, 2012, and printed material as disclosed in "NFC Method, Arrangement and Setup" US Pub. No. 2012/0309307 filed Jun. 1, 2012, the entirety of the above disclosures are hereby incorporated by reference.

Figure 2:
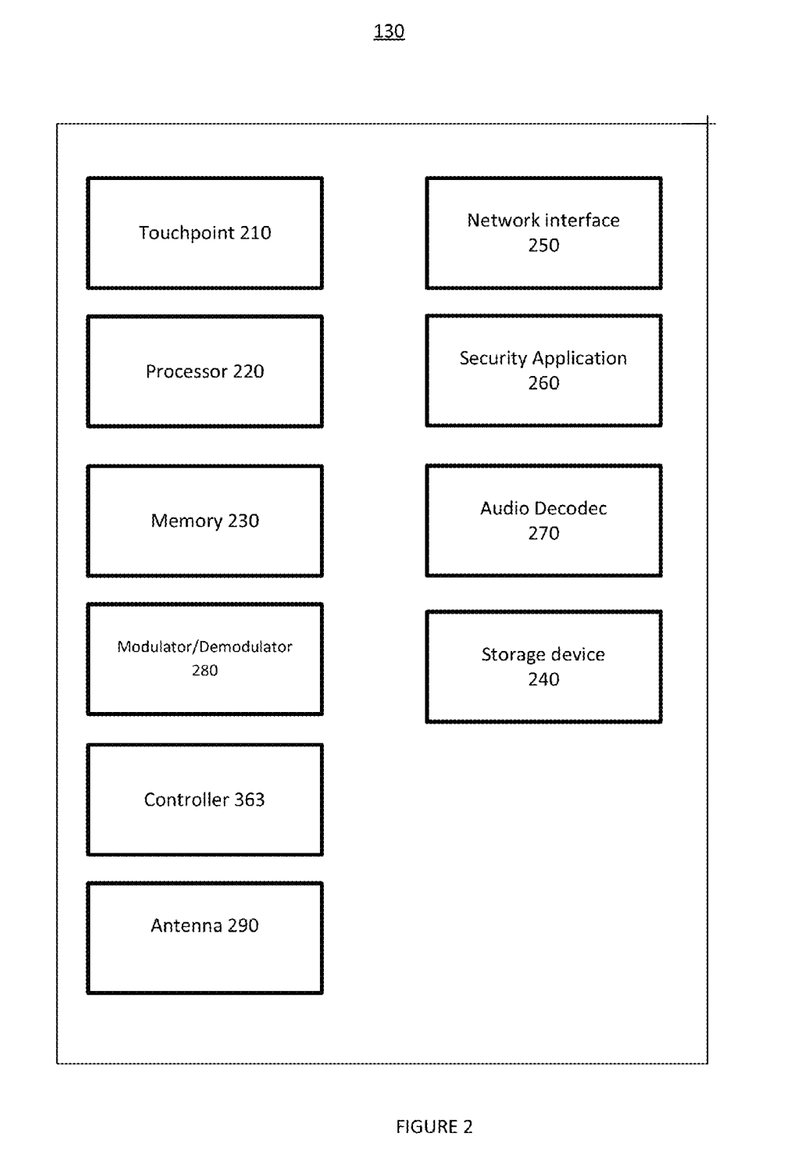
FIG. 2 is a block diagram of an NFC device.

FIG. 2 illustrates a block diagram of the NFC-enabled device 130. The NFC device 130 may comprise a touchpoint 210, a processor 220, memory 230, a controller 363, a storage device 240, a modulator/demodulator 280, and an antenna 290. The processor 220, memory 230, modulator/demodulator 280 and antenna 290 maybe be utilized to perform NFC functionality as known in the art. Furthermore, the NFC device 130 may also comprise a network interface 250, an audio codec 270, and security application 260.

The NFC-enabled device 130 may be operated in a passive mode in which the NFC-enabled device 130 draws its operating power from the electromagnetic radiation emitted by an interrogating NFC-enabled device (i.e. NFC-enabled device 130 performs like a passive NFC tag). Alternatively the NFC-enabled device 130 may be equipped and powered with its own power supply and may also power interrogating NFC devices.

Referring back to FIG. 1, according to one embodiment the NFC-enabled device 130 may be connected to server 150 by network 140 using network interface 250. The network interface 250 may be a wireless transceiver, network interface controller such as an Ethernet adapter, modem, or any other suitable device for connecting devices to a network as commonly known in the art. The NFC-enabled device 130 may retrieve and store user data, security authentication data, software updates, firmware updates, audio files and other appropriate data and services from server 150, allowing the NFC-enabled to be dynamic.

Figure 3:
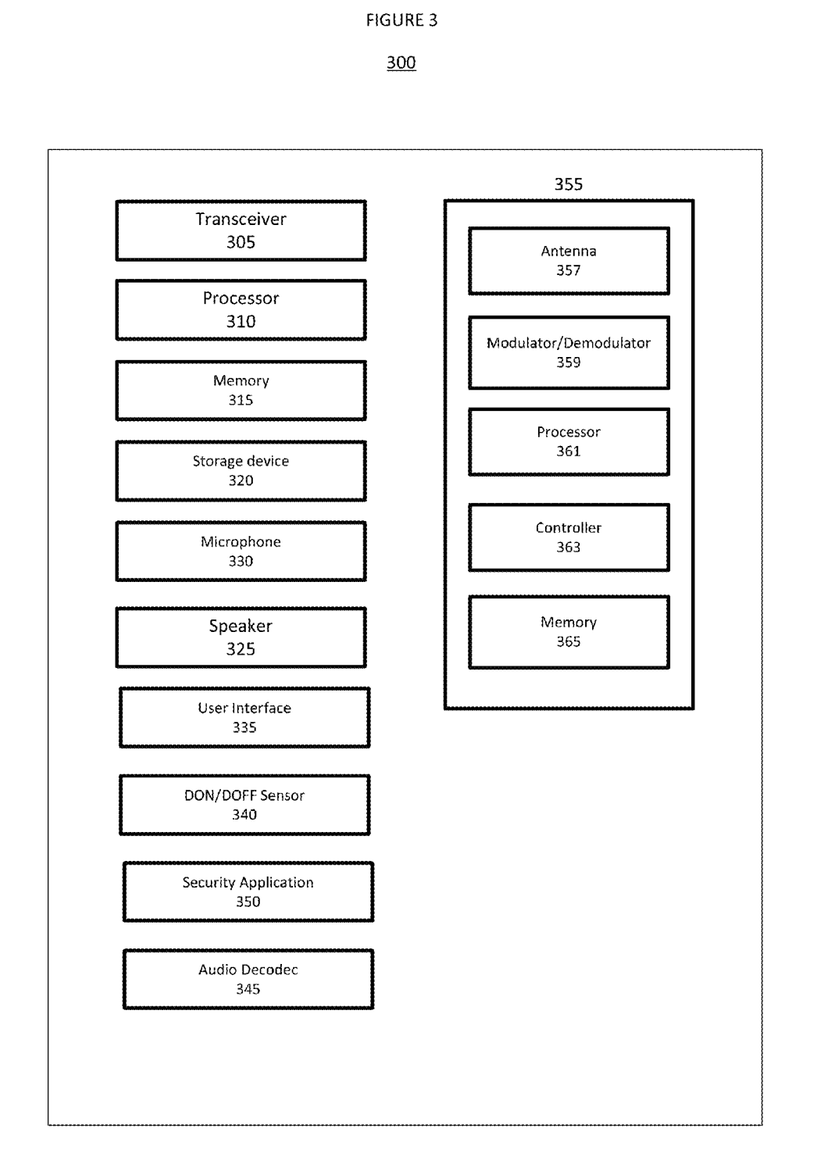
FIG. 3 is a block diagram of a headset.

FIG. 3 illustrates a block diagram of a headset 120. The headset 120 comprises a transceiver 305, a processor 310, memory 315, a storage device 320, a microphone 330, a speaker 325, a user interface 335, a don/doff sensor 340, a security application 350, an audio codec 345, and an NFC module 355.

The NFC module 355 may comprise typical NFC components known in the arts such as an antenna 357, modulator/demodulator 359, processor 361, controller 363, and memory 365. Each component of the NFC module 355 may be a separate and independent component or combined into one unit. For example, the processor 361, controller 363 and memory 365 may be disposed on a single IC chip (e.g. NFC chip). Furthermore, components of the NFC module 355 may be a part of a component outside the NFC module 355. For example, processor 361 may be a part of processor 310 (i.e. a sub-component on the same chip); memory 365 may be a subset of memory 315. That is, the NFC module 355 may share resources and operate in conjunction with the other headset 120 components to NFC-enable the headset 120.

The NFC module 355 may be operated in a passive mode in which the NFC module 355 draws its operating power from the electromagnetic radiation emitted by an interrogating NFC-enabled device (i.e. headset 120 performs like a passive NFC tag). Alternatively the NFC module 355 may be equipped and powered with a battery within the headset and may also power interrogating NFC devices.

Referring again to FIG. 1, in use the user 101 "taps" the headset 120 to the touchpoint 135. The headset 120 may or may not be donned on the user while tapping the headset 120. Upon tapping, a communication protocol is established between the headset 120 and NFC-enabled device 130. Next, the NFC-enabled device 130 delivers audio content to the headset 120. Audio content may be any content that enables the user to playback an audio file. As used herein, the term "audio file" refers any audio file suitable for audio playback such as an mp3 or wave file. It may also include streaming audio that is constantly received and presented to the user while being delivered.

Audio content delivery may be achieved by transmitting the actual audio file directly to the headset itself or a reference, pointer, or any other information used to identify the location of the audio file's location to enable a user's device, such as the headset or smart phone, to retrieve an audio file for playback. For example, the audio content may comprise an audio locator reference such as a uniform resource locator (URL), IP address, telephone number, or radio frequency.

Before delivering the audio content the NFC-enabled device 130 may authenticate the headset 120 or user 101 using methods commonly known in the arts such as a Public Key Infrastructure (PKI). The security authentication method may also be suitable for a headset such as the methods described in commonly assigned "Methods and Systems for Secure Pass-Set Entry" US Publication No. 20120050008A1 filed Aug. 31, 2010 which is hereby incorporated by reference. Security application 350 and security application 260 may work in conjunction to perform the authenticity.

In one embodiment, the NFC-enabled device 130 stores the audio content locally on storage device 240 and will transmit audio content directly to the headset 120. In an alternative embodiment, the audio content may be stored on server 150. Upon tapping, the audio content may be transmitted from server 150 to NFC-enabled device 130 and subsequently transmitted from NFC-enabled device 130 to headset 120. Furthermore, the audio content maybe already stored on headset 120 or smart phone 110 and the NFC-enabled device 130 is only used to "unlock" the audio content. For example, a user may download a smart phone application containing an audio file such as a song or narrative. The audio file can only be unlocked when the user 101 is located at the NFC-enabled device 130. A marketing campaign for an album release may unlock a sneak preview of the album when a user visits a particular record store where a NFC poster is located; a tour guide narrative may be unlocked when a tourist is at a particular exhibit. Pre-storing the audio file on the headset 120 or smart phone 110 is particularly useful when the audio data is large in size and cannot be conveniently transmitted between NFC devices.

According to another embodiment, the audio file is stored on a remote device (not shown). In this case, when tapped the NFC-enabled device 130 provides the headset 120 a reference or pointer to the audio file as described above. The headset 120 may then retrieve the audio file; the headset 120 may then communicate over another network, using transceiver 305, to retrieve the audio file.

Furthermore, the headset 120 may also instruct the smart phone 110 to retrieve the audio file. In one embodiment, when the headset 120 is tapped to the NFC-enabled device 130, the NFC-enabled device 130 may transmit an instructional message to the headset 120. The headset 120 may then relay the instructional message to the smart phone 110 in order to launch an application, open a website or otherwise retrieve audio content as known in the arts.

Figure 4:
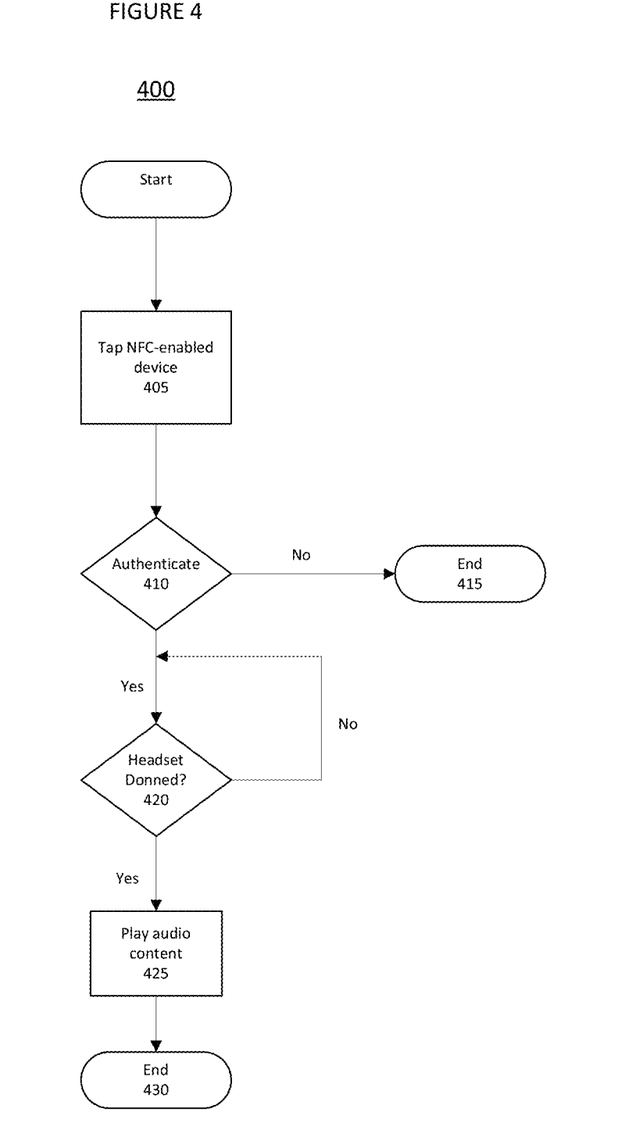
FIG. 4 is a flow chart illustrating receiving an audio message on a headset.

In one embodiment, the headset 120 may delay playing the audio content at speaker 325 until the headset 120 is donned (see FIG. 4). The headset 120 may determine if a user dons or doffs the headset by use of a DON/DOFF sensor 340 as described in commonly assigned "Donned and doffed headset state detection" U.S. Pat. No. 8,335,312B2 filed Oct. 2, 2006 and "Clip-worn device with don/doff sensor" US Publication No. 20100109895 filed Nov. 6, 2008 which are hereby incorporated by reference.

Furthermore, the headset 120 may control playback responsively to the donned condition of the headset as described in commonly assigned "Donned/Doffed Multimedia File Playback Control" Publication No. 2010-0020982A1 filed Jul. 28, 2008 which is hereby incorporated by reference.

In another embodiment, the headset 120 may delay playing the audio content at speaker 325 until the user 101 engages the user interface 335. For example, after tapping the user must activate a play button found on the headset body to initiate audio file playback.

This feature is particularly useful in the case where the user 101 doffed his or her headset in order to tap the NFC-enabled device 130. If audio content begins to play immediately upon tapping, the user will miss part of the audio content due to finite time it takes to don the headset. Delaying or pausing playback will prevent the user from missing some audio content if he or she is not able to immediately don the headset after tapping. Furthermore, if the smart phone 110 is responsible for retrieving and playing the audio, resuming or initiating playback may occur automatically when a donned condition is detected. This is advantageous to the user 101 as he or she does not need to interface with the smart phone 110 and may keep the smart phone 110 stored in their pocket when retrieving the audio. Since the headset 120 is presumably more accessible and easily detached from the user's head, this system provides a more convenient and efficient delivery of audio over the prior art.

FIG. 4 is a flow chart illustrating delivering audio content to NFC-enabled headset. For example, the process illustrated may be implemented by the system 100 shown in FIG. 1 At block 405 the user taps an NFC-enabled device with an NFC-enabled headset. Next, the NFC-enabled device may optionally authenticate the headset. If the headset is not authorized, the NFC-enabled device denies the headset access to the audio content and the process ends at 415. If the headset is authorized, the NFC-enabled device transmits the audio content (or information referring to the location of the audio content as describe above) to the headset.

Upon authentication 410, it is determined if the headset is donned at 420. If not donned, the headset may pause or delay playback of the audio until it detects a donned condition. If the headset is donned, the headset plays the audio content at block 425. Alternatively the headset may wait for a user interface confirmation before initiating playback. Upon playing the audio content, the process ends 430.

Figure 5:
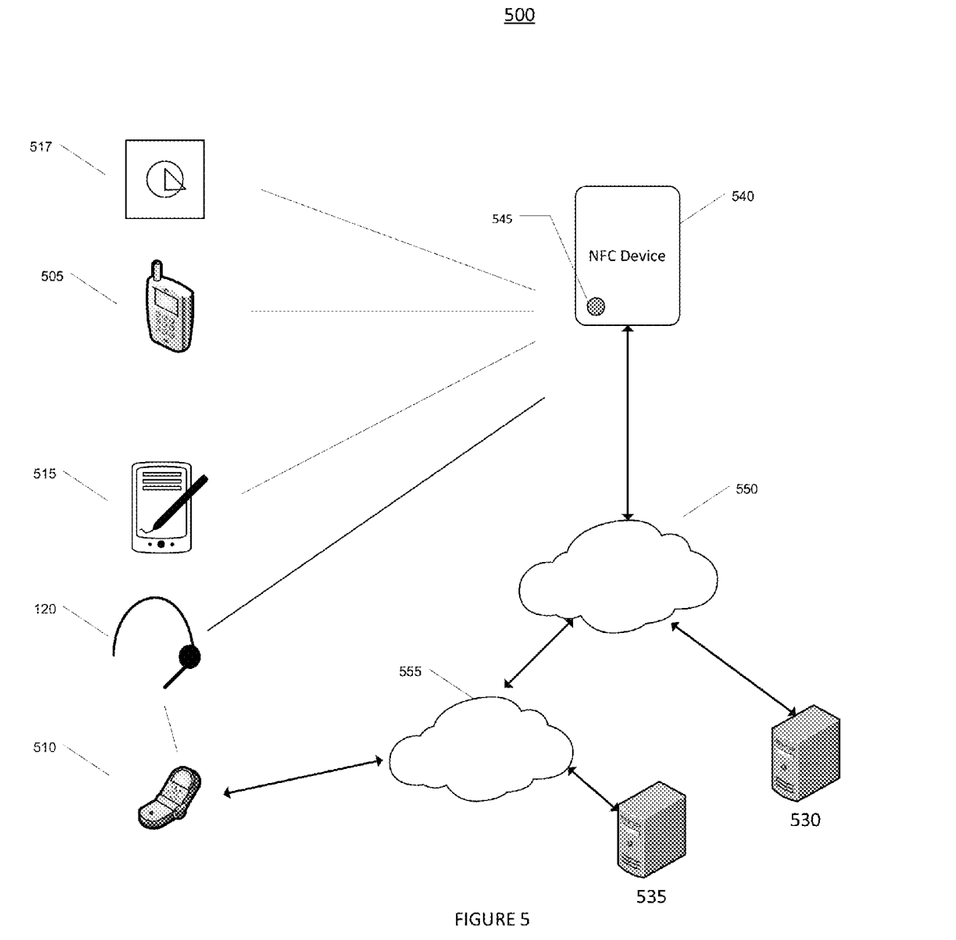
FIG. 5 is a schematic of a message exchange system.

Referring to FIG. 5, shown is an audio message delivery system 500 according to another embodiment of the invention. The system comprises headset 120, a first phone 505, a second phone 510, a computing device 515, multimedia playback device 517, an NFC-enabled device 540, a first network 555, a second network 550, a first server 535 and a second server 530. Similar to the system and elements of FIGS. 1-3, the NFC-enabled device 540 comprises a touchpoint 545 and the headset 120 is NFC-enabled. Furthermore first phone 505, second phone 510, multimedia playback device 517, and computing device 515 are also NFC-enabled to communicate with NFC-enabled device 540. First network 555 and second network 550 may be communicatively coupled and may comprise respective intermediate networks.

In one embodiment of the invention, a user may use headset 120 to record an audio message. The audio message may be recorded on the headset 120 using the microphone 330. The audio message is compressed, encoded and stored using the processor 310, audio codec 345, memory 315, and storage device 320 of the headset 120 as commonly known to someone skilled in the arts.

Alternatively the audio message may be recorded with a device in communication with the headset. This is particularly useful if the device in communication with the headset is not equipped with a microphone but is equipped with an audio input. For example headset 120 may be coupled with multimedia playback device 517. A user may utilize the headset's microphone 330 to provide the multimedia playback device 517 with an audio message. The multimedia playback device 517 may then compress, encode, and store the audio message. In a further embodiment, the device in communication with the headset only provides audio processing. For example, the headset 120 may be paired with second phone 510. Second phone 510 may receive the audio content from the headset 120. Once received, the second phone 510 may then compress and encode the audio message and subsequently transmit the processed message back to the headset 120 for storage onto storage device 320.

According to another embodiment of the invention, the audio message may be recorded then stored on a remote device. For example, the audio message may be transmitted in real-time communication, using a protocol such as WebRTC, over the network 555 to first server 535. After the message is recorded, it is stored on first server 535. The first server 535 may return a reference or pointer to the audio message such as a uniform resource locator (URL) or IP address to the headset 120. The reference is used to later identify the audio message and retrieve it as previously described. The reference to the audio message may then stored be at the headset 120 for later use.

Audio content saved on headset 120 can then be transmitted and saved onto NFC-enabled device 540 when the headset 120 and NFC-enabled device 540 is tapped. Before receiving the audio content the NFC-enabled device 540 may authenticate the headset 120 using methods commonly known in the arts such as a Public Key Infrastructure (PKI) to ensure an authorized headset is saving content onto the NFC-enabled device 540. Once saved onto the NFC-enabled device 540, the audio content is available to other parties to retrieve. If an audio message reference is transmitted from the headset 120 to the NFC-enabled device 540, the NFC-enabled device 540 may subsequently retrieve the audio message from server 535 over second network 550 and first network 555 and store it on the NFC-enabled device 540. In addition to the audio content, the headset 120 may also transmit security information associated with the audio content. The NFC-enabled device 540 may then use this security information to determine which devices may download the audio content.

In one embodiment, users may retrieve the audio message stored on the NFC-enabled device 540 using components and methods similar to those described in FIGS. 1-4. The audio content may also be retrieved from other NFC-enabled devices capable of playing or storing audio such as a first phone 505, a computing device 515, or media playback device 517.

In a further embodiment, other parties may be notified when an audio message has been recorded and ready to be retrieved. For example, upon transmitted and storing the audio message or audio message reference onto NFC-enabled device 540, the NFC-enabled device 540 may notify second server 530 over second network 550 that an audio message has been saved onto the NFC-enabled device 540. Next, server 530 may then notify other users that an audio message is ready for retrieval. Alternatively, the NFC-enabled device 540 may notify users directly. The notification may contain additional information to the users such the location of the NFC-enabled device 540, time the message was recorded, times the message is available, the device that recorded the message, the user associated with the device that recorded the message and the security authorization level of the message.

The notice may be sent to first phone 505, computing device 515, or media playback device 517 using e-mail, RSS feed, SMS, instant messages and any other appropriate medium commonly known to one skilled in the art. The notice may also appear on the NFC-enabled device 540 itself. For example, if the NFC-enabled device 540 comprises a user interface device such as a display screen, it may display a message on the display screen notifying users that an audio message is currently available.

Figure 6:
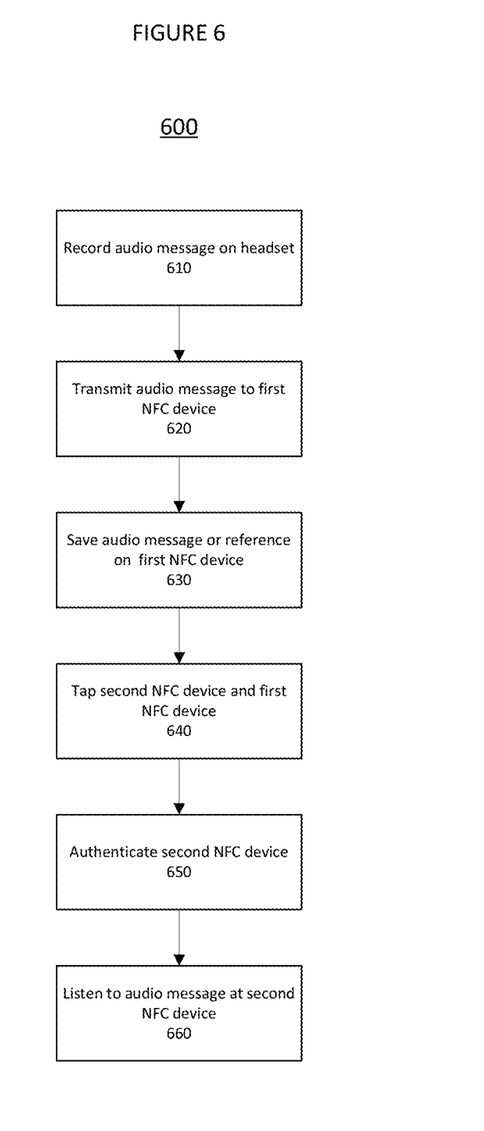
FIG. 6 is a flow chart illustrating an audio message delivery system.

FIG. 6 is a flow chart illustrating an audio message delivery system. For example, the process illustrated in FIG. 6 may be implemented with the system 500 shown in FIG. 5. At block 610, an audio message is recorded and stored utilizing an NFC-enabled headset. The audio file may be stored on the headset itself or on a remote server as described above. Next, the user taps the headset onto a first NFC-enabled device and the audio message (or reference to audio message) is transmitted at 620. The audio message (or reference to audio message) is saved onto the first NFC-enabled device at 630 and is available for retrieval. Another NFC-enabled device may then retrieve the audio message by tapping onto a second NFC-enabled device at 640. Optionally, the first NFC-enabled device may authenticate the second NFC-enabled device before transmitting the audio message at block 650. Once retrieved, the audio message may be played back to a user at 660 or stored on the second NFC-enabled device for later playback. In the case where the audio message is stored on a remote server and a reference to the audio message was retrieved, second NFC-enabled device by itself or in combination with another device may retrieve the message from the remote server as previously disclosed. The second NFC-enabled device for retrieving the audio may also be another headset. For example, the functions of blocks 640 to 660 may be embodied by functions and elements as described for FIG. 4.

Various embodiments of the present disclosure can may be implemented in digital electronic circuitry, or in computer hardware, firmware, software, or in combinations thereof. Embodiments of the present disclosure can may be implemented in a computer program product tangibly embodied in a computer-readable storage device for execution by a programmable processor. The described processes can may be performed by a programmable processor executing a program of instructions to perform functions by operating on input data and generating output. Embodiments of the present disclosure can may be implemented in one or more computer programs that are executable on a programmable system including at least one programmable processor coupled to receive data and instructions from, and to transmit data and instructions to, a data storage system, at least one input device, and at least one output device. Each computer program can may be implemented in a high-level procedural or object-oriented programming language, or in assembly or machine language if desired; and in any case, the language can may be a compiled or interpreted language. Suitable processors include, by way of example, both general and special purpose microprocessors. Generally, processors receive instructions and data from a read-only memory and/or a random access memory. Generally, a computer includes one or more mass storage devices for storing data files. Such devices include magnetic disks, such as internal hard disks and removable disks, magneto-optical disks; optical disks, and solid-state disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can may be supplemented by, or incorporated in, ASICs (application-specific integrated circuits). As used herein, the term "module" may refer to any of the above implementations.

What is claimed is:

1. A method of delivering an audio message, the method comprising:
   recording an audio message with a first headset;
   storing the audio message;
   activating a close proximity data exchange interaction between the first headset and a close proximity data exchange device;
   transmitting audio content from the first headset to the close proximity data exchange device;
   activating a close proximity data exchange interaction between a second headset and the close proximity data exchange device; and
   transmitting the audio content from the close proximity data exchange device to the second headset.

2. The method of claim 1, wherein:
   the close proximity data exchange device is a near field communication (NFC)-enabled device; and
   the close proximity data exchange interactions are NFC interactions.

3. The method of claim 2, wherein the audio content comprises the audio message.

4. The method of claim 3, wherein the audio message is stored on the first headset.

5. The method of claim 2, wherein recording the audio message comprises compressing the audio message.

6. The method of claim 2, wherein the audio message is stored on a remote device and the audio content comprises an audio locator reference associated with the audio message.

7. The method of claim 2, further comprising authenticating the first headset prior to transmitting the audio content from the first headset to the NFC-enabled device.

8. The method of claim 2, further comprising authenticating the second headset prior to transmitting the audio content from the NFC-enabled device to the second headset.

9. The method of claim 2, further comprising sending a notification message when the audio content has been transmitted from the first headset to the NFC-enabled device.

10. The method of claim 2, further comprising playing the audio message at the second headset.

\* \* \* \* \*